May 13, 1941.  K. PETERSEN  2,241,734
METHOD OF MAKING FERTILIZERS
Filed Aug. 21, 1936
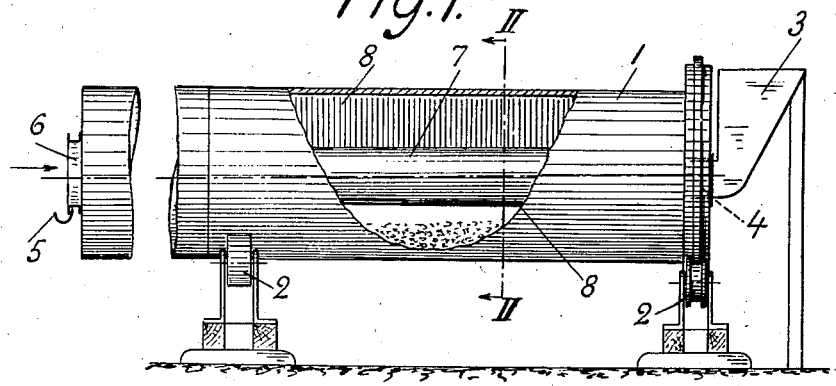
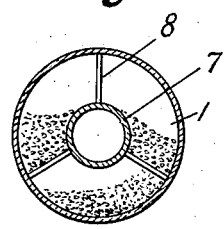
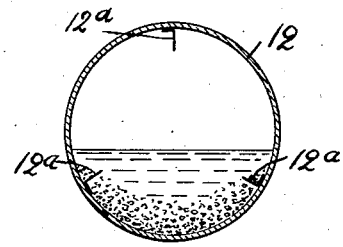
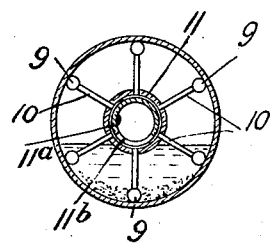
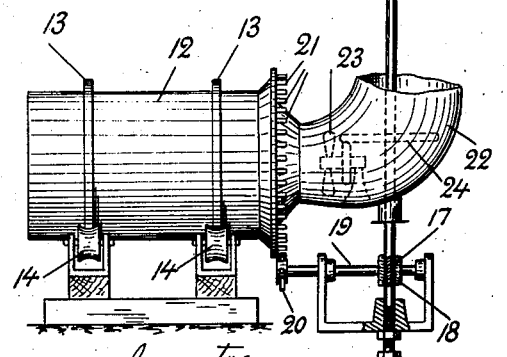
Inventor
Kai Petersen
By Spear, Donaldson & Hall
Attys Patented May 13, 1941

2,241,734

UNITED STATES PATENT OFFICE 2,241,734

METHOD OF MAKING FERTILIZERS

Kai Petersen, Soborg, near Copenhagen, Denmark

Application August 21, 1936, Serial No. 97,276
In Denmark August 26, 1935

3 Claims. (Cl. 71—9)

The object of the present invention is to provide a method of making fertilizers, soil improving agents or substances not causing hygienic difficulties from organic matter in solid or more or less liquid form, particularly from waste materials of vegetable or animal origin, such as garbage, offal, night-soil, sewage sludge, feces from water closets or industrial, forestal or horticultural waste material or mixtures thereof.

Another object of the invention is to provide an apparatus for carrying out the method.

The invention is based on observations of the biological process occurring in the so-called "compost heaps" when the heaps are dug up now and then and care is taken to maintain a suitable degree of moisture in the heap.

In the compost heap a biological conversion partly of aerobic character will take place so that in the course of from two years to three years a humus-like and mould-like mass is formed which has a large content of useful microorganisms and frequently constitutes a universal and very valuable fertilizer having a highly physical and biological power.

Similar circumstances as those described above prevail for a great part on places of discharge and in night-soil.

In places of discharge as well as in compost heaps both an anaerobic biological conversion and an aerobic one take place, and this conversion involves great losses of fertilizing values. Particularly the anaerobic conversion involves great losses in form of gaseous conversion products, which also give rise to nasty smell.

The present invention provides a method, by which the natural biological conversion of the waste materials can be carried out in a more effective manner and also improved from a hygienic point of view, whereas the conversion period can be reduced to about 2-3 hours, the conversion products in addition being more valuable.

According to the principal feature of the method of the invention the raw materials in question are subjected to a regulated aerobic biological conversion or transformation in a rotating container during passage of air at over-pressure or partial vacuum through the container.

With regard to the class of materials to be subjected to the biological conversion it is remarked that the materials may be intermixed and/or disintegrated by appropriate dispersing methods. Some raw materials, such as night-soil, need not be comminuted, while others, such as garbage and offal and the like have to be brought into a finely divided state in order to make the biological conversion possible. Sometimes it is also advisable to first separate inorganic matter contained in the raw materials in a manner known per se and to add some water before the raw materials are subjected to the biological conversion. The oxygen contents of the air passed through the container, in which the conversion takes place, may also be suitably increased in any known manner.

After the biological conversion it is preferred to concentrate the more or less completely converted liquid mass by sedimentation, centrifugation or natural or artificial drying.

The most favorable conditions of the vital functions of the aerobic bacteria during the biological conversion are provided by comminution of the raw material. For instance a bacteriological analysis has proved that in 3 hours the aerobic organisms are multiplied from 20 millions per gram to 800 millions per gram, i. e. 40 times, by the process of the invention.

As indicated above the biological conversion takes place in a rotatable container. In order to promote the conversion the rotating container may contain distributing bodies, such as chippings of stones, slags, wooden pieces and cork pieces, beer-capsules or other inorganic matter, for instance members separated from the raw materials before they are subjected to the biological conversion. The distributing bodies act as carrying bodies for the converting mass and the microorganisms in said mass. Thus, during the rotation an intimate and uniform contact is provided throughout the material under treatment between the same, the air and the moisture, said contact involving a most rapid and uniform aerobic conversion process and preventing an anaerobic conversion. Moreover owing to the agitation and friction the bacteriological film formed on the carrying bodies acting as bodies of vegetation for the microorganisms does not become too thick, and the microorganisms of the film do not grow too old before they are rubbed off.

The finely divided materials preferably are carried continuously through the rotating container either in the same direction as the air passing through the same or in counter-current thereto. The constantly shifting intimate contact established by the present method over extraordinary great surfaces between the vegetation films or layers and the air and between the vegetation layers and the raw materials forms a characteristic feature of the invention. Heretofore biological conversion, particularly of waste-water, has—it is admitted—been performed technically, but no sufficient regard has been paid to the fact that it is an essential condition for the continued biological action that the thickness of the vegetation films or layers should constantly be kept down. By the process according to the invention the superfluous bacteria on the vegetation bodies will be removed by the relative motions of the same and the movements of said bodies relative to the walls of the container and simultaneously the volatile reaction products formed will be rapidly and easily carried away together with the air stream passing through the container. Hereby clogging due to sludge is avoided. The gases, if any, formed by the conversion process and carried away with the air stream can be collected in a manner known per se. It is preferable that the amount of air necessary to the biological conversion process be procured by suction, but on the other hand the air may be blown through the container.

The gases produced wholly or partly may be returned to the container, preferably at the end of the conversion process or air or gases leaving the plant may be deodorized in a known manner.

The final product of which a certain portion is preferably continuously returned to the beginning of the process or to an intermediate stage for maintaining the amount of bacteria necessary for a high capacity of the plant can be used as a finished fertilizer in the form in which the product leaves the rotating container, or as above stated the product may be brought into a more concentrated and dry condition by sedimentation, centrifugation, drying or other known methods.

A product thus produced and dried constitutes a non-smelling valuable biological fertilizer without morbid germs or seed of weeds.

It can be used separately or, if desired, be mixed up with known inorganic fertilizers.

The invention will be more particularly described with reference to the accompanying drawing which illustrates some embodiments of an apparatus for carrying out the method explained.

Fig. 1 is an elevation, partly in section, and with parts broken away, of an apparatus according to the invention, Fig. 2 is a cross-section of the same along the line II—II of Fig. 1, Fig. 3 is a cross-section of a modified form of the apparatus, Fig. 4 is an elevation, partly in section, of a further embodiment of the apparatus, and Fig. 5 on a somewhat larger scale shows a cross-section of the latter.

The apparatus shown in Fig. 1 comprises a rotatable aerating container or drum 1 in which the biological conversion process takes place. The container is mounted on rollers 2 and is driven by any suitable drive gear not shown, such as a worm gear or toothed wheels.

The suitably comminuted and sorted material is filled into the container through a hopper 3, water being simultaneously added thereto. The hopper is stationary and covers the circular central inlet opening 4 in the end wall of the container. The converted material is carried away as a pulp through a stationary chute 5 associated with the circular outlet opening 6 of the container which outlet opening is found in the opposite end wall of the container and has a somewhat greater diameter than that of the inlet opening. The outlet opening is covered by a strainer or sieve-plate not shown.

The construction of the interior of the aerating container appears from Fig. 2. The container is provided with a hollow central core 7 (which instead could be solid), and the annular space between the core and the circumferential wall of the container by means of grates 8 is divided longitudinally into a plurality of compartments, for instance three compartments, as shown in Fig. 2. About two thirds of the volume of each of said three compartments is filled up with vegetation bodies, such as small chippings of stones, slags, wooden pieces, cork pieces or the like, the size of which is for instance like that of a hazel nut. The more freely the type of vegetation bodies selected allows the air and liquid to pass through the interstices between said bodies the greater the portion of each compartment filled up with such bodies may be made without any risk of fouling or clogging due to sludge or unduly high air resistance occurring.

The material fills up the rotating aerating container to a certain level. During the rotation all of the vegetation bodies which have a very great total superficial area will constantly perform a rushing movement both in relation to the drum and to each other, and they will alternately be submerged into the liquid and lifted so as to come in contact with the air flowing through the aerating container, and hereby the bacteriological film characteristic of the growth of the aerobic bacteria is formed on the vegetation bodies, which film due to the continuous friction between the vegetation bodies can not reach a detrimental thickness or age. It has been found that when using comparatively coarse vegetation bodies for treating about one half ton waste material through 24 hours the mere great surface of the vegetation bodies combined with the alternate moistening and aerating of the same equals the active surface obtained by spreading the raw material in a thin layer of a thickness of 0.003 mm. over an area of about 400 acres. By the said combined action the biological effect characteristic of the invention is obtained.

The venting of the container is established by drawing or blowing the air through the container by means of an exhauster or the like not shown on the drawing, the air passing either in the same direction as that of the material or in counter-current thereto, and the gases from the container can be collected or deodorized by known means not shown.

The aerating container instead of being cylindrical may have a polygonal or oval cross-section, and it can be rotated continuously or intermittently, eventually in shifting directions.

The above described mode of operation of the aerating container can also be effected in other ways. Instead of using a longitudinally divided space for accommodating vegetation bodies the construction shown in Fig. 3 may be adopted where a system of equidistantly spaced perforated tubes 9 is arranged lengthwise of and adjacent the inner circumferential wall of the cylindrical container. These tubes by radial pipes 10 are in communication with the hollow cylindrical core 11 of the container, which core receives a stationary air supply conduit 11$^a$ having a downwardly facing longitudinal slot 11$^b$. By this means the air supply is automatically cut off to the pipes 10 when not submerged into the pulp of material.

The aerating container may also be equipped with rigidly secured or loose lamina or with wires or pipes perpendicular to or parallel with the axis of rotation of the container. In constructing the aerating container care should only be taken that the elements necessary for creating a great surface are housed in a rotating casing the "floor" of which is constantly turned up from the liquid contents into the air stream and back again.

While the aerating container thus far described, if desired, may form a part of or be combined with a more complicated industrial plant of great proportions, which may include various sorting devices, grinding mills, conveyors, washing and straining devices for air and gases as well as exhausters, drying apparatus etc., all of which may be of known construction, Figs. 4 and 5 show a complete apparatus in accordance with the invention which is adapted for smaller capacities and may be used for instance by garden owners or the like.

This apparatus consists of a barrel 12, for instance an iron drum, having two projecting rings 13 mounted on rollers 14 carried by a suitable support. The drum has a plurality of radial drivers or scoops 12ª, Fig. 5, which during the rotation of the drum lift suitable disintegrating bodies found in the drum to a certain level and then let them fall so as to thereby crush and comminute the organic material in the drum. The drum is kept in continuous rotation by a wind rotor 15 or the like, a worm 17 secured on the vertical shaft 16 of the wind rotor meshing with a worm gear 18 carried by a horizontal shaft 19 which in turn by means of a sprocket wheel 20 engages teeth 21 of the drum 12 and thereby drives the latter. In order to increase the stream of air through the drum a screw fan 23 is mounted in a conduit 22 opposite to the inlet end of the drum, said fan being driven by a friction disc 24 carried by the shaft 16 of the wind rotor.

The said disintegrating bodies also act as vegetation or distributing bodies in the sense indicated above. Thus both the comminution of the material and the biological conversion thereof are effected in the same rotating container.

The various apparatus described may be substantially modified without departing from the frame and scope of the invention.

Having thus fully described my invention I claim as new and desire to secure by Letters Patent:

1. The method of producing fertilizers and soil improving agents from organic waste materials which comprises supplying the waste material in question to a solid-walled container in a finely divided state such amounts of water being present that the finely divided solids are dispersed in a continuous aqueous phase incorporating in the aqueous dispersion a material rich in aerobic bacteria active at ordinary temperatures, distributing coarse freely movable bodies into the said dispersion the bulk of said bodies containing a plurality of interstices, mechanically agitating the said bodies by rotating the container simultaneously preventing sedimentation of the finely divided solids, alternately raising some of the said bodies above the level of the bulk of the said dispersion and returning them thereto, passing air through the interstices of the elevated bodies to aerate the finely divided solids adhering to such bodies and to promote the growth of the aerobic bacteria present in the said solids and active at ordinary temperatures, the bodies when returned into the bulk of the aqueous dispersion serving to distribute the air contained in the interstices of the bodies into the bulk of the said dispersion; thereby effecting a biological decomposition (mineralization and nitrification) of the finely divided solids at ordinary temperatures by means of the said aerobic bacteria and providing thin active films of the aerobic bacteria on the said bodies and maintaining by attrition said films sufficiently thin to prevent undue ageing of the bacteria and to avoid anaerobic conversion and continuing said mode of operation for a period of time in the order of a few hours thereby producing a mass in which the aerobic bacteria are present in a high concentration and having a high fertilizing value.

2. The method of producing fertilizers and soil improving agents from organic waste materials which comprises supplying the waste material in question to a solid-walled container in a finely divided state, such amounts of water being present that the finely divided solids are dispersed in a continuous aqueous phase, distributing coarse freely movable bodies into the said dispersion, the bulk of said bodies containing a plurality of interstices, mechanically agitating the said bodies by rotating the container simultaneously preventing sedimentation of the finely divided solids, alternately raising some of the said bodies above the level of the bulk of the said dispersion and returning them thereto, passing air through the interstices of the elevated bodies to aerate the finely divided solids adhering to such bodies and to promote the growth of the aerobic bacteria present in the said solids and active at ordinary temperatures, the bodies when returned into the bulk of the aqueous dispersion serving to distribute the air contained in the interstices of the bodies into the bulk of the said dispersion; thereby effecting a biological decomposition (mineralization and nitrification) of the finely divided solids at ordinary temperatures by means of said aerobic bacteria and providing thin active films of the aerobic bacteria on the said bodies, and maintaining by attrition said films sufficiently thin to prevent undue ageing of the bacteria and to avoid anaerobic conversion, and continuing said mode of operation for a period of time of the order of a few hours thereby producing a mass in which the aerobic bacteria are present in a high concentration and having a high fertilizing value.

3. The method of producing fertilizers and soil improving agents from organic waste materials which comprises supplying the waste material in question to a solid-walled container in a finely divided state, such amounts of water being present that the finely divided solids are dispersed in a continuous aqueous phase, distributing coarse freely movable bodies into the said dispersion, mechanically agitating the said bodies by rotating the container simultaneously preventing sedimentation of the finely divided solids, alternately raising some of the said bodies above the level of the bulk of the said dispersion and returning them thereto, passing air over the elevated bodies to aerate the finely divided solids adhering to such bodies and to promote the growth of the aerobic bacteria present in the said solids and active at ordinary temperatures, thereby effecting a biological decomposition (mineralization and nitrification) of the finely divided solids at ordinary temperatures by means of the said aerobic bacteria and providing thin active films of the aerobic bacteria on the said bodies, and maintaining by attrition said films sufficiently thin to prevent undue ageing of the bacteria and to avoid anaerobic conversion, and continuing said mode of operation for a period of time of the order of a few hours thereby producing a mass in which the aerobic bacteria are present in a high concentration and having a high fertilizing value.

KAI PETERSEN.